Figure 1:
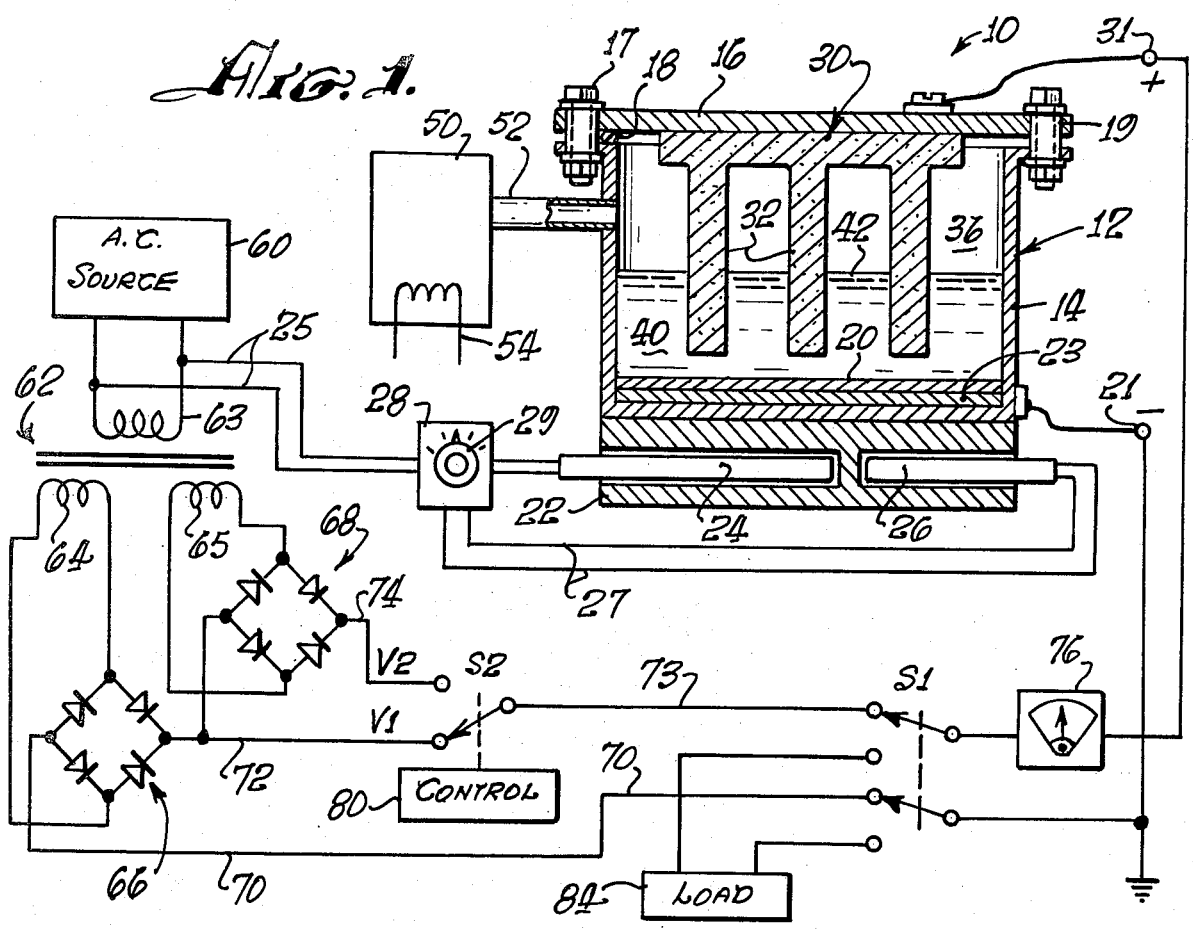

United States Patent [19]
England

[11] 3,912,999
[45] Oct. 14, 1975

[54] ZINC-HALIDE BATTERY WITH MOLTEN ELECTROLYTE

[75] Inventor: Christopher England, Pasadena, Calif.

[73] Assignee: California Institute of Technology, Pasadena, Calif.

[22] Filed: July 11, 1973

[21] Appl. No.: 378,126

[52] U.S. Cl.............. 320/22; 136/6 LF; 136/30; 320/21
[51] Int. Cl...................... H01m 4/38; H01m 10/44
[58] Field of Search........ 136/30, 86 A, 86 E, 86 R, 136/83 T, 153, 865; 320/21, 22

[56] References Cited
UNITED STATES PATENTS
| | | | |
|---|---|---|---|
| 2,291,739 | 8/1942 | McGrath | 136/83 T |
| 3,357,862 | 12/1967 | Greenberg et al. | 136/83 T |
| 3,650,834 | 3/1972 | Buzzelli | 136/153 |

Primary Examiner—John H. Mack
Assistant Examiner—H. A. Feeley

[57] ABSTRACT

This electrochemical cell uses zinc and either chlorine or bromine as the primary reactants, with a molten, non-aqueous zinc halide electrolyte. During charging of the cell, growth of dendrites on the zinc electrode is controlled by operating the cell continuously or intermittently at a temperature above the melting point of zinc, thereby positively preventing such growth; or by operating at such temperature that incipient dendrites are melted by heat generated by the charging current. That current may be intermittently increased to insure such dendrite control. In a large battery of cells utilizing chlorine as the halogen, excess halogen gas developed during charging of the battery is compressed and liquefied to facilitate external storage, and a large portion of the energy required for compression is recovered upon expansion of the gas during battery discharge.

5 Claims, 2 Drawing Figures

ZINC-HALIDE BATTERY WITH MOLTEN ELECTROLYTE

This invention concerns a secondary battery or voltaic cell of the general type comprising a metal negative electrode, a non-aqueous liquid electrolyte including a molten halide of the metal, and an essentially inert positive electrode.

In such batteries the primary reaction during charging of the battery is deposition of metal from the electrolyte upon the negative electrode and the formation at the positive electrode of liquid or gaseous halogen. The opposite reactions accompany generation of electric current by the battery. The electrodes are ordinarily designated anode and cathode according to the current flow during discharge of the cell, so that the negative electrode is the anode and the positive electrode is the cathode.

Secondary batteries of that general type have been proposed. For example, U.S. Pat. Nos. 3,632,448 and 3,650,834 describe batteries which employ aluminum anodes and molten electrolytes comprising mixtures of aluminum halide and various alkali metal halides.

A serious disadvantage presented by such batteries is the tendency for the metal deposited on the anode to form dendrites, or long whiskers, which eventually contact the cathode and short the cell. The growth of such dendrites can be partially controlled by inserting porous membranes or similar separators between anode and cathode; but such separators offer only a partial remedy since they are frequently penetrated by the dendrites.

In accordance with one aspect of the present invention, the growth of dendrites on the anode of batteries of the described general type is avoided by operating the battery at temperatures that are not only above the melting temperature of the electrolyte, but above or nearly equal to the melting temperature of the anode itself.

In an illustrative and preferred form of the invention, the cell anode consists essentially of metallic zinc, which has a melting point of about 420°C; and the molten electrolyte includes at least a major proportion of zinc halide. That halide may be either the chloride or the bromide of zinc. Such a cell can be operated regularly with the anode in molten condition. Shorting of the cell by dendrite formation is thereby completely avoided.

For some purposes it may be preferable to operate such a cell ordinarily within the temperature range at which the anode is solid but the electrolyte is molten; and to raise the temperature above the melting point of the anodic material only periodically during charging of the cell. Growth of dendrites can be terminated in that way before they cause any trouble.

A further aspect of the invention utilizes the heat generated by the charging current for melting incipient dendrites, either continuously or during relatively brief pulses of elevated current. In that mode of operation the battery temperature is typically maintained only slightly below the melting temperature of the anode. The same concentration of current at the locus of an incipient dendrite that tends to cause dendrite growth then also tends to raise the temperature of the dendrite above melting temperature, terminating its growth. If the normal value of the charging current is not adequate to melt the dendrites reliably, or if it does so only at a cell temperature closer to the anode melting temperature than can readily be maintained without complex controls, occasional short pulses of relatively high current can insure melting of incipient dendrites without producing injurious effects such as might result from continued use of excessive charging currents.

In accordance with a further aspect of the invention, an auxiliary chamber is provided in communication with the main body of the cell for storage of the halogen produced during charging of the cell. Such an auxiliary chamber is preferably maintained at such temperature that the halogen gas becomes liquefied, greatly reducing the required chamber volume. If the halogen is chlorine, such liquefaction is preferably aided by inserting an effectively reversible gas compressor in the line between the main cell and the auxiliary chamber. During the charging of the cell such a compressor is driven by a suitable power source to compress the chlorine gas to such pressure that it becomes liquid at the temperature of the auxiliary chamber. A nearly equivalent amount of power is recovered by allowing the compressor to be driven by the compressed gas which evaporates from the auxiliary chamber when electrical current is drawn from the cell. Such liquefaction of the excess chlorine by compression is particularly effective in connection with a large installation in which the reversible compressing apparatus can be connected in parallel with a very large number of cells.

Figure 2:
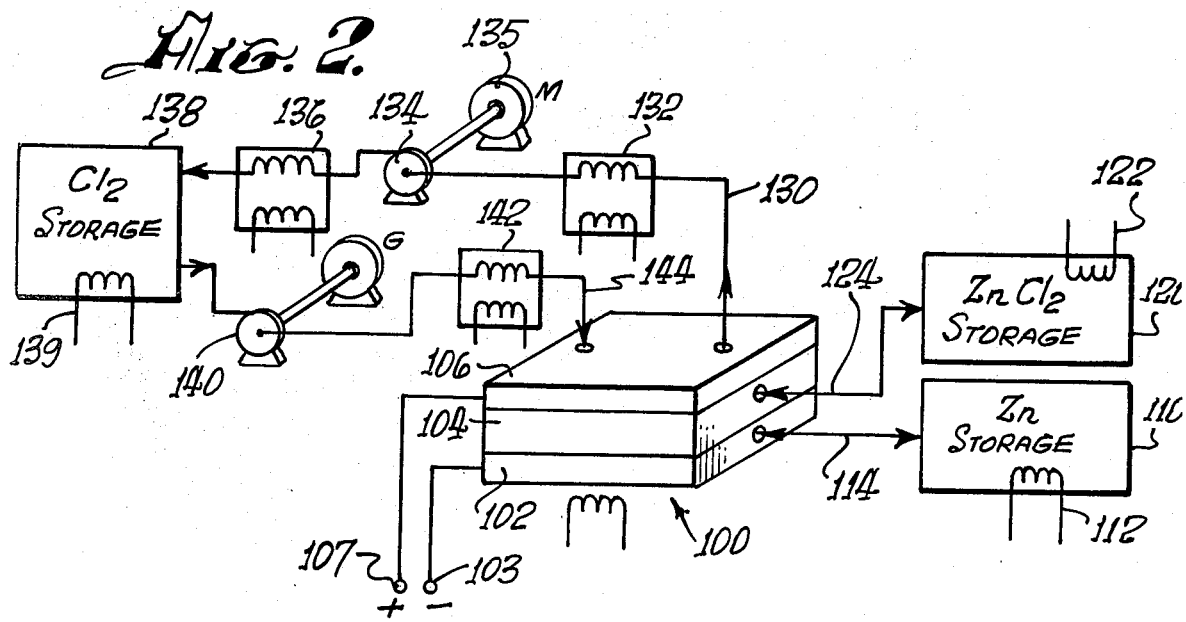

A full understanding of the invention, and of its further objects and advantages, will be had from the following description of certain illustrative manners of carrying it out, with reference to the accompanying drawings, in which:

FIG. 1 is a schematic drawing including a vertical section representing an illustrative cell embodying certain aspects of the invention and electrical circuitry for charging the cell; and FIG. 2 is a schematic diagram representing a battery system embodying further aspects of the invention.

As shown schematically in FIG. 1, the illustrative cell 10 comprises the housing structure 12, formed of the vessel 14 and the cover 16, which are releasably secured together by the bolts 17, with suitable sealing and insulating means, represented by the gasket 18. Insulating sleeves 19 are provided between the bolts and cover 16. Heating and temperature sensing means of any suitable type are represented in FIG. 1 as the electrical heater 24 and the sensor 26. Those elements are mounted in respective bores in the thick base plate 22, which is formed of material such as aluminum having good heat conductivity. Control circuitry for heater 24, is indicated schematically at 28, receiving electrical power from the conventional power source 60 via the lines 25, and receiving via the lines 27 from sensor 26 an electrical control signal representing the existing vessel temperature. Control circuitry 28 is typically of known type, and controls the current supplied to heater 24 in such a way as to maintain vessel 14 at a definite temperature which can be controllably varied by means of the knob 29.

The negative electrode or anode comprises the layer 20 of solid or liquid zinc, which is deposited electrolytically upon the bottom surface of vessel 14, or upon a sheet 23 of any suitable, relatively inert material, such as graphite, for example, upon which metallic zinc can readily be deposited electrolytically. The positive electrode or cathode 30 is mounted internally on the housing cover 16 and includes the depending electrode structures 32, typically formed of graphite.

Electrical connections to the battery are typically made via the negative terminal 21, which is connected to anode 20 via the conductive wall of vessel 14, and the positive terminal 31, which is connected to cathode 30 via cover 16.

The cell chamber 36 is initially loaded with a measured or weighed quantity of zinc halide, which is typically added in powdered or granular condition and then melted by heat generated by heater 24. Additives of suitable type may be included with the zinc halide, for example to increase the electrical conductivity of the overall electrolyte. The utility of alkali metal halides such as sodium and potassium chloride and bromide for that purpose is well known, as described, for example, in the above identified prior art patents. The resulting body of molten electrolyte is indicated at 40 in FIG. 1, with the free surface 42. Cathode formations 32 project below that surface into the body of the electrolyte.

An auxiliary chamber 50 is indicated schematically in FIG. 1, communicating via the conduit 52 with the interior of housing 12 at a point above free surface 42 of the electrolyte. Auxiliary chamber 50 and the portion of cell chamber 36 above the electrolyte are preferably purged of gas other than the halogen that is to act with zinc as primary reagents in the cell. That may be done in any suitable manner, as by evacuating those chambers before the cell is electrically charged.

The cell is charged by connecting terminals 21 and 31 to a suitable source of direct current of such voltage that current enters at cathode 30 and leaves at anode 20. FIG. 1 includes a schematic representation of an illustrative circuit for supplying such current and for controlling dendrite growth in accordance with one aspect of the invention. In actual practice, many similar cells are typically connected to terminals 21 and 31 partly in parallel and partly in series, the voltage and current capabilities of the circuit being designed accordingly. However, reference will be made to a single cell for the sake of definiteness.

A source of conventional alternating current power is indicated at 60, connected to the primary 63 of the step-down transformer 62. Transformer 62 has the two secondary windings 64 and 65, which are electrically isolated from each other and are connected to the respective full wave rectifying bridge circuits 66 and 68. The direct current output from rectifier 66 is connected to the lines 70 and 72, while the output from rectifier 68 is connected to line 72 and to the line 74. With line 70 typically grounded, lines 72 and 74 are then maintained at respective positive voltages V1 and V2, V2 being larger than V1. With the switch S1 in charging position, as shown in the drawing, battery terminals 21 and 31 are connected to the respective lines 70 and 73, applying to the battery either the normal charging voltage V1 or the higher voltage V2 according to the position of switch S2.

The value of V1 is so adjusted, as by selection or adjustment of circuit components, that in normal position of S2, as illustrated, the resulting charging current in cell 10 has a suitable normal value. The resulting current flow in the cell from cathode to anode causes deposition of zinc from the electrolyte on the upper surface of anode 20, and causes the release of halogen as gas at the cathode. That gas escapes through the electrolyte surface 42 into the free portion of chamber 36 and auxiliary chamber 50. Thus, the thickness of the zinc layer on anode 20 progressively increases during charging, and the pressure within the cell due to released gas also increases.

In the present embodiment of the invention, auxiliary chamber 50 may be made large enough so that in fully charged condition of the cell all of the halogen developed can be stored in gaseous form without exceeding the pressure which the cell is designed to withstand. Alternatively, the maximum pressure in the cell can be limited to a relatively low value by cooling auxiliary chamber 50, as indicated schematically by the heat exchange coil 54, to a suitable temperature. When the halogen is bromine, cooling of the gas to about 60°C is sufficient to maintain approximately atmospheric pressure in the cell. In the case of chlorine the corresponding temperature is approximately −34°C.

In order to control dendrite growth, temperature control adjustment 29 is typically set to maintain anode 20 and the body of the electrolyte at a temperature which is less than the melting point of zinc by a definite selected value, typically only 1° or 2°. If any dendrite growth should then occur at normal charging current, the dendrites reduce the effective electrical resistance between anode and cathode, leading to a corresponding increase in the actual current flowing. That increase is readily measurable by conventional instrumentation, indicated schematically at 76. If such current increase beyond a selected threshold should occur, switch S2 is shifted to upper position, either manually or by the control mechanism 80, which may include a servo device of conventional construction. The charging voltage is thereby increased from V1 to V2, increasing the charging current by a large step of predetermined size, such as two- or three-fold, for example. That increased current increases the local heating in the neighborhood of the dendrite or dendrites that were responsible for the progressive current increase. The magnitude of the stepwise current increase is so selected that such local heating raises the temperature above the melting point of zinc, eliminating the dendrites typically in a few seconds. Switch S2 is then returned to normal position, and charging of the cell continues at normal current.

After the cell has been sufficiently charged, switch S1 can be shifted to lower position, connecting terminals 21 and 31 to whatever load device 84 is to be operated by power from the battery. Conventional circuitry may be provided, if desired, to permit connection of the battery to a load also during the charging process.

A further aspect of the invention is illustrated schematically in FIG. 2. The bulk storage of electrical energy is useful for many purposes, such, for example, as reducing the peak powder demands made on the generating facilities of the electric utility industry. Bulk storage for such purposes may be accomplished by very large batteries of cells of the general type already described. Such a battery is represented schematically at 100, with the zinc anodes of all cells of the battery represented collectively at 102, the molten zinc halide electrolyte of all cells at 104, and the graphite and halogen cathodes at 106. In the present embodiment the cells are maintained above the melting point of zinc, so that the zinc anodes comprise molten zinc. Since the density of zinc is more than twice that of zinc halide and of the usual electrolyte additives such as alkali metal halides, a sharply defined interface is maintained by gravity between the molten anode and the molten electrolyte. Electrical connections are indicated schematically between anode 102 and the negative terminal 103, and between cathode 106 and the positive terminal 107, the remainder of the electrical system being typically conventional, and being omitted for clarity of illustration.

For handling large amounts of energy, for example in the megawatt range, it is desirable to provide storage facilities apart from the electrical cells themselves for accommodating the varying quantities of all three of the active components of the cells. As indicated schematically in FIG. 2, the molten zinc of the cell anodes is maintained at uniform level in the respective cells by storing the variable excess in a suitable reservoir 110, which is typically maintained above the melting point of zinc by the heat exchange means indicated at 112. The conduit 114 between reservoir 110 and cell battery 100 may operate largely by gravity, but preferably includes suitable control means such as valves and reversible pumps of conventional type, not explicitly shown.

A generally similar storage system is provided for the molten electrolyte, comprising the reservoir 120, heated by the heat exchange coil 122 and communicating with the individual cells of battery 100 via the conduit 124. By maintaining the depths of both anode and electrolyte substantially independent of the condition of charge or discharge of the battery, the efficiency of the latter is appreciably improved.

The gaseous halide produced by the individual cells during charging of the battery is conducted to the conduit 130, and is then cooled in heat exchange device 132 to a convenient temperature. In a system utilizing zinc bromide as the primary electrolyte component, the resulting gaseous bromine is readily liquefied, and can then be stored in liquid form. On the other hand, if the halogen used as reactant is chlorine, as will be assumed in the further description of FIG. 2, the cooled chlorine gas is compressed by the compressor 134, which is driven by any suitable power means, such as the electric motor 135. The compressed gas is cooled and liquefied in the heat exchanger 136 and the resulting liquid is stored in the reservoir 138. Since energy is ordinarily stored in battery 100 at a definite rate, the flow of chlorine gas normally has a definite corresponding value, greatly facilitating design and control of compressor 134, as well as its associated valves and control mechanism, not explicitly shown. By providing compressor 134 in the chlorine line, the present system is able to store the excess chlorine in relatively small space, and at the same time the pressure in battery 100 can be limited to a convenient value such as normal atmospheric pressure, and reservoir 138 can be operated at convenient temperature such as normal atmospheric temperature.

When battery 100 is to be shifted over to power-delivering mode, chlorine is allowed to evaporate from reservoir 138, the heat of vaporization being typically supplied by the heat exchange coil 139. The resulting chlorine gas at a relatively high pressure, typically several atmospheres, is supplied to the turbo-expander indicated schematically at 140. Expander 140 extracts energy from the compressed gas, delivering chlorine gas at battery pressure. That gas may be raised approximately to battery temperature by the heat exchanger 142, and is then supplied to the individual cells via the conduit 144 at a rate corresponding to the current being drawn from the battery. Expander 140 is typically coupled to an electric generator 141 so that the energy developed from the gas stream during battery discharge is recovered in electrical form.

Compressor 134 and expander 140, together with their respective conduits and suitable valve or other control means, not explicitly shown, may be designated collectively as reversible fluid pump means. Other manners of instrumenting the described operations will be obvious to those skilled in the art and also come within the designation, reversible fluid pump means. In particular, the separate channels shown in FIG. 2 for fluid flow in the two directions may be replaced wholly or partially by a single channel which includes a unitary pump mechanism that is operable alternatively to produce flow in one direction while compressing the gas and to allow flow in the other direction while extracting energy from expansion of the gas.

As already indicated, the energy recovered from the gas expansion during battery operation is an appreciable fraction of the energy consumed for gas compression during charging of the battery. In a system employed for reducing the peak power requirements of an electric generating station, the battery charging and discharging phases are typically separated in time by at least several hours. Hence power recovered from the expander cannot be used directly for operating the compressor. However, the energy recovered still constitutes an appreciable economy, especially since it becomes available during the peak power requirement of the overall system.

I claim:

1. The method of controlling dendrite growth during charging of a secondary electrical cell which includes a solid zinc anode and a molten electrolyte consisting essentially of zinc halide which is electrolyzed during charging of the cell to metallic zinc and halogen, said method comprising
   maintaining the electrolyte at a charging temperature which is higher than the melting temperature of the electrolyte and is only slightly less than the melting temperature of zinc,
   and charging the cell at a normal charging current of such magnitude that dendrites growing from the anode into the electrolyte are melted by heat generated locally by the charging current.

2. In combination with a secondary electrical cell which includes a solid zinc anode and a molten electrolyte consisting essentially of zinc halide which is electrolyzed during charging of the cell to metallic zinc and halogen, means for charging the cell, comprising
   means for maintaining the electrolyte at a charging temperature which is higher than the melting temperature of the electrolyte and is only slightly less than the melting temperature of zinc,
   circuit means for normally impressing upon said cell a normal charging current,
   and means for intermittently modifying the circuit means to produce pulses of elevated charging current such that dendrites growing from the anode into the electrolyte in presence of the normal charging current are melted by heat generated locally by the elevated charging current.

3. Cell charging means according to claim 2 including means for monitoring said normal charging current to detect any current increase due to growth of dendrites, and servo means controlled by the monitoring means for initiating action of said circuit modifying means.

4. A secondary electrical cell comprising a zinc anode, a molten non-aqueous electrolyte contacting the anode and including at least a major proportion of molten zinc chloride, a body of fluid chlorine separated from the anode by the electrolyte, an inert cathode contacting the chlorine and the electrolyte and separated from the anode by the electrolyte, cell enclosure means including means for normally maintaining the cell at a temperature above the melting temperature of the electrolyte and including structure forming an auxiliary chamber in communication with the cell through reversible fluid pump means, and means for operating the pump means to condense excess chlorine in the auxiliary chamber during charging of the cell and to recover energy from expansion of chlorine evaporating from the auxiliary chamber during discharging of the cell.

5. The method of controlling dendrite growth during charging of a secondary electrical cell which includes a solid zinc anode and a molten electrolyte consisting essentially of zinc halide which is electrolyzed during charging of the cell to metallic zinc and halogen, said method comprising charging the cell at a charging current which normally has a first current value, intermittently increasing the charging current to a second value higher than said first value, and maintaining the electrolyte at a temperature which is higher than the melting temperature of the electrolyte and is less than the melting temperature of zinc by a temperature interval such that growing dendrites are melted by heat generated by at least the charging current of said second value.

* * * * *